United States Patent
Karamanolis et al.

(10) Patent No.: US 7,984,254 B2
(45) Date of Patent: Jul. 19, 2011

(54) METHOD AND SYSTEM FOR GENERATING CONSISTENT SNAPSHOTS FOR A GROUP OF DATA OBJECTS

(75) Inventors: Christos Karamanolis, Los Gatos, CA (US); Matthew Benjamin Amdur, Cambridge, MA (US); Patrick William Penzias Dirks, Monte Sereno, CA (US)

(73) Assignee: VMware, Inc., Palo Alto, CA (US)

( * ) Notice: Subject to any disclaimer, the term of this patent is extended or adjusted under 35 U.S.C. 154(b) by 500 days.

(21) Appl. No.: 12/098,116

(22) Filed: Apr. 4, 2008

(65) Prior Publication Data
US 2009/0254693 A1     Oct. 8, 2009

(51) Int. Cl.
*G06F 13/00* (2006.01)
(52) U.S. Cl. .................................................. 711/162
(58) Field of Classification Search ............... None
See application file for complete search history.

(56) References Cited

U.S. PATENT DOCUMENTS

| | | | |
|---|---|---|---|
| 7,765,187 B2 * | 7/2010 | Bergant et al. | 707/614 |
| 2004/0243775 A1 | 12/2004 | Coulter et al. | |
| 2005/0216788 A1 | 9/2005 | Mani-Meitav et al. | |
| 2006/0085663 A1 | 4/2006 | Sutoh | |
| 2007/0106857 A1 * | 5/2007 | Koning et al. | 711/162 |

OTHER PUBLICATIONS

International Search Report and Written Opinion as mailed in PCT Application No. PCT/US2009/038737 on Oct. 29, 2009.

* cited by examiner

*Primary Examiner* — Duc T Doan

(57) ABSTRACT

Snapshots that are consistent across a group of data objects are generated. The snapshots are initiated by a coordinator, which transmits a sequence of commands to each storage node hosting a data object within a group of data objects. The first command prepares a data object for a snapshot. After a data object has been successfully prepared, an acknowledgment is sent to the coordinator. Once all appropriate acknowledgments are received, the coordinator sends a command to confirm that a snapshot has been created for each data object in the respective group. After receiving this confirmation, the coordinator takes action to confirm or record the successful completion of the group-consistent snapshot.

6 Claims, 10 Drawing Sheets

METHOD AND SYSTEM FOR GENERATING CONSISTENT SNAPSHOTS FOR A GROUP OF DATA OBJECTS

BACKGROUND OF THE INVENTION

Storage systems provide means for storing and retrieving nonvolatile data via read and write operations. The nonvolatile data may be organized into data objects, such as physical or logical volumes, file systems, files, or any other technically appropriate organization. Many storage systems implement snapshot capabilities for data objects to enable data backup, data replication, disaster recovery, point-in-time travel for debugging, and continuous data protection. A snapshot of a data object is an immutable instance of the data object, reflecting the state of the data object at a certain point in time.

An important property of snapshots is that they always reflect a consistent state of the data object. In other words, a snapshot should reflect a plausible state of the data object at some point in time. A snapshot of a data object should reflect a write operation W2 only if all write operations to the same object that are potential causal predecessors of W2 are reflected in the same snapshot. A write operation W1 is a potential causal predecessor of W2 if and only if W2 is issued by the storage client application after the completion of W1.

Certain storage client applications may operate on multiple data objects and generate causal write sequences that span multiple data objects. In such cases, generating crash-consistent snapshots for individual data objects does not ensure that the set of snapshots of the multiple data objects reflects a consistent application state. This may occur, for example, when a storage client application operating on multiple data objects generates a causal chain of write requests where a first write request is carried out on a first data object and after it completes a second write request is carried out on a second data object, and the snapshots for the first data object and the second data object are carried out independently. In such a case, the second write might be reflected in the snapshots but its predecessor write, the first write, might not be, and as a result the snapshots would not have the property referred to herein as "group crash consistency." For a group of data object snapshots to be crash consistent (i.e., group crash-consistent), a write operation W should be reflected on a snapshot in the group only if all write operations, to any object with a snapshot in the group, that are potential causal predecessors of W are reflected in a snapshot of the same group.

SUMMARY OF THE INVENTION

One or more embodiments of the invention provide a method and a system for coordinating snapshots for multiple data objects so that snapshots that are consistent across a group of data objects can be created.

According to a first embodiment, a method for coordinating snapshots for multiple data objects includes the steps of issuing a first command to block new I/O operations issued to the data objects, receiving a response to the first command, issuing a second command to confirm that each of the data objects has been successfully requested to create a snapshot, and receiving a response to the second command acknowledging that a snapshot has been created for each data object. For each of the data objects, after new I/O operations are blocked, pending I/O operations associated with that data object are completed and then a snapshot of that data object is created. Also, for each of the data objects, after the second command is issued, new I/O operations issued to that data object are unblocked, and at least one storage node that manages the data objects issues the response to the second command when it has confirmed that a snapshot has been created for each of the data objects.

According to a second embodiment, a method for coordinating snapshots for multiple data objects includes the steps of issuing a first command to block the completion of any I/O operations issued to the data object and then create a snapshot, receiving a response to the first command, issuing a second command to confirm that a snapshot of each of the data objects has been created, and receiving a response to the second command. For each of the data objects, after I/O completion is blocked and before a response to the first command is transmitted, a snapshot of that data object is created, and after the second command is issued, I/O completion is unblocked, and at least one storage node that manages the data objects issues the response to the second command when it has confirmed that a snapshot has been created for each of the data objects.

A system for generating group-consistent snapshots, according to an embodiment of the invention, includes at least one storage node managing at least a first data object and a second data object, wherein at least one storage node is programmed to block new I/O operations issued to the first and second data objects, complete pending I/O operations associated with the first and second data objects, and then create a snapshot of the first and second data objects, upon receiving a command to generate group-consistent snapshots.

A system for generating group-consistent snapshots, according to another embodiment of the invention, includes at least one storage node managing at least a first data object and a second data object, wherein the at least one storage node is programmed to block the completion of any I/O operations issued to the first and second data objects and then create a snapshot of the first and second data objects, upon receiving a command to generate group-consistent snapshots.

The term "storage node" as used herein has the meaning accorded thereto by persons skilled in the art. In one embodiment, it is an element, e.g., a computing device including a processor and a memory, that controls I/O operations to one or more data objects.

DETAILED DESCRIPTION

Figure 1:
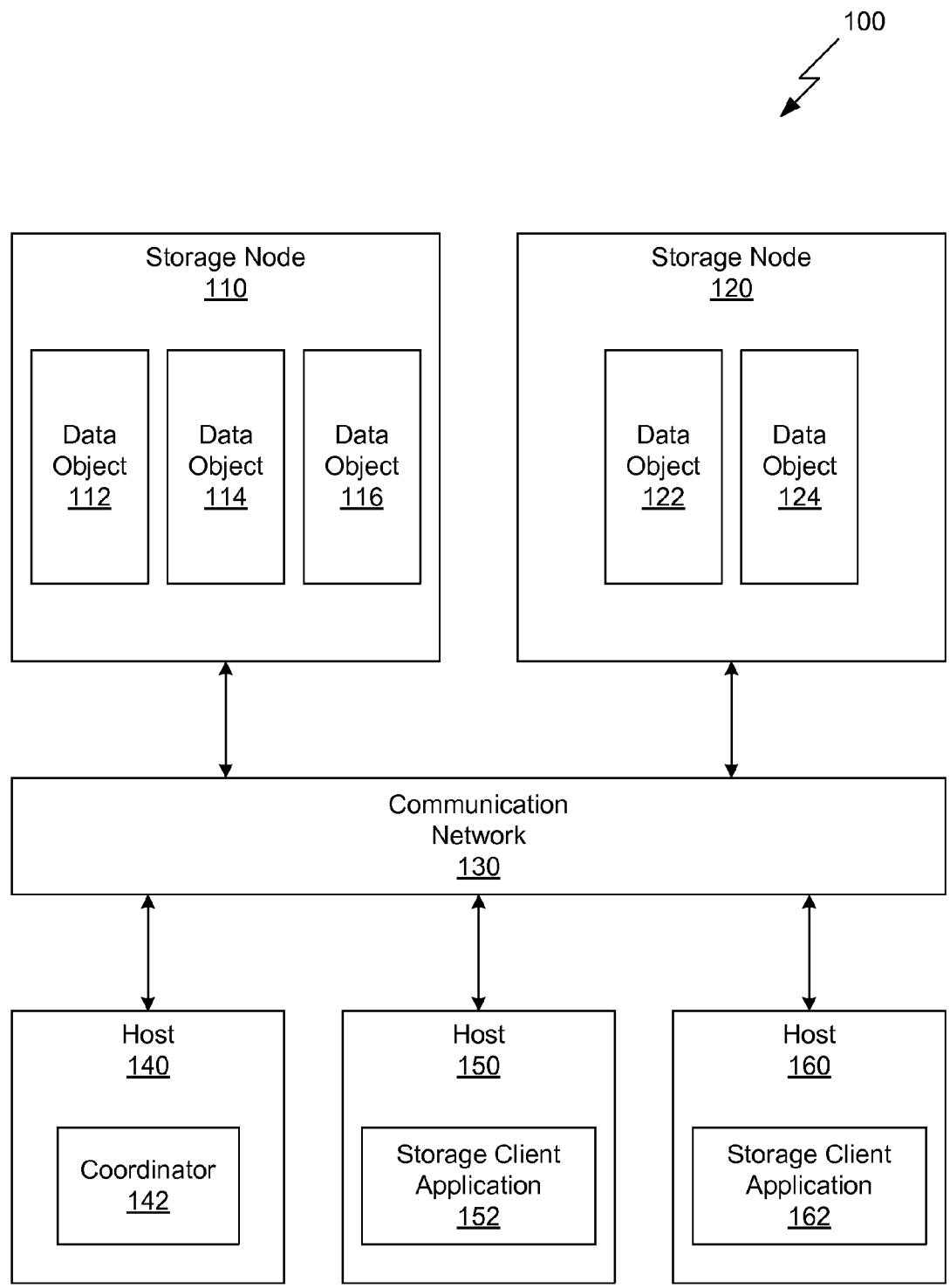
FIG. 1 is a block diagram illustrating a computer system configured to implement one or more embodiments of the invention.

FIG. 1 is a block diagram illustrating a computer system 100 configured to implement one or more embodiments of the invention. The computer system 100 includes storage nodes 110 and 120, a communication network 130, and application hosts 140, 150 and 160.

Each application host 140, 150, 160 may be a physical computer, a virtual computer, a virtual machine, or any other technically feasible virtual or physical computational platform. Application host 140 includes a coordinator 142 configured to communicate with the storage nodes 110, 120, and application hosts 150, 160 via the communication network 130. Application host 150 includes a storage client application 152, configured to communicate with storage node 110 and storage node 120 via the communication network 130. Similarly, application host 160 includes a storage client application 162, configured to communicate with storage node 110 and storage node 120 via the communication network 130.

The communication network 130 may be any technically feasible system for providing communications, including, without limitation, an Ethernet network, a Fiber Channel, an InfiniBand network, or any communication either through hardware or software constructs. Also, coordinator 142 may reside on a stand-alone host (e.g., host 140), on the same application host as the storage client applications (e.g., host 150 or host 160), or on a storage node (e.g., storage node 110, storage node 120, or a separate storage node).

Each storage node 110, 120 provides access to nonvolatile (persistent) storage managed by the storage node. Persistent storage includes hard disk drives, non-volatile semiconductor memory, network-attached storage, storage area network storage, or any other persistent storage media known in the art. The storage capacity may be organized into data objects, where each object may be referenced and accessed independently. Each storage node can persistently store metadata to associate an individual data object snapshot with a group-consistent snapshot. A group-consistent snapshot is identified by an identifier (denoted as "Sx" herein), which is unique for the set of data objects. In one embodiment, the coordinator assigns the identifier. Storage node 110 includes data objects 112, 114, 116. Storage node 120 includes data objects 122, 124. In general, a storage node includes one or more data objects. Also, the data objects may be grouped in any arbitrary manner and managed using any of the techniques known in the art. For example, data objects 112 and 114 may form a group; or data objects 116, 122, and 124 may form a group. The group association of data objects is arbitrary and independent of any physical association with a specific storage node. Thus, a storage node may include one or more data objects.

Figure 2:
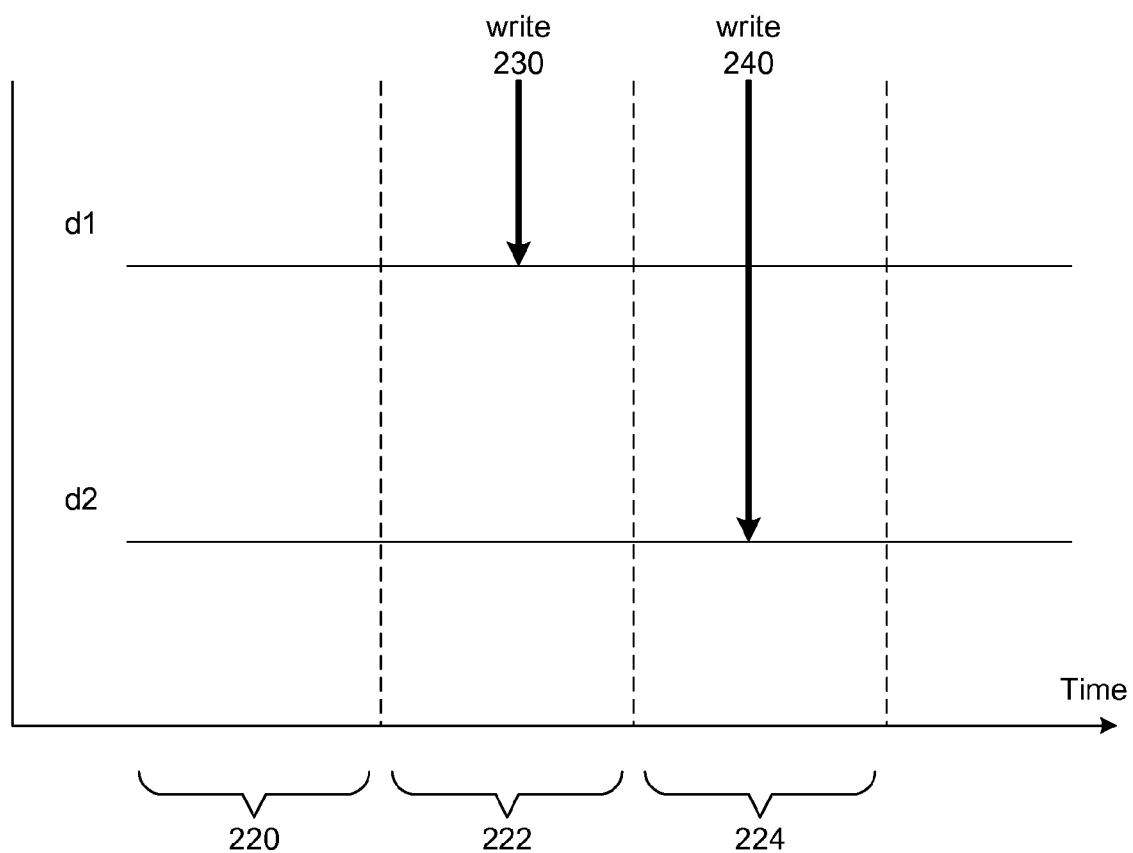
FIG. 2 illustrates a sequence of two related writes to two different data objects.

FIG. 2 illustrates a sequence of two related writes (write 230 and write 240) to two different data objects (d1 and d2). Write 230 is the predecessor of write 240. In other words, there is a potential causal dependence between write 230 and write 240, such that write 230 must come before write 240. Persons skilled in the art will recognize that such causal dependencies may exist even between write operations that are issued from different hosts. There are three possible consistent states describing the progression of writes 230 and 240 on data objects d1 and d2. During time period 220, neither write 230 nor write 240 has completed. A snapshot of this state would be consistent. During time period 222, write 230 has been completed. A snapshot of this state would also be consistent. During time period 224, write 230 and write 240 have both completed. A snapshot of this state would also be consistent, and would reflect both writes 230, 240. However, a snapshot that includes write 240 but does not include write 230 would not be consistent.

Figure 3:
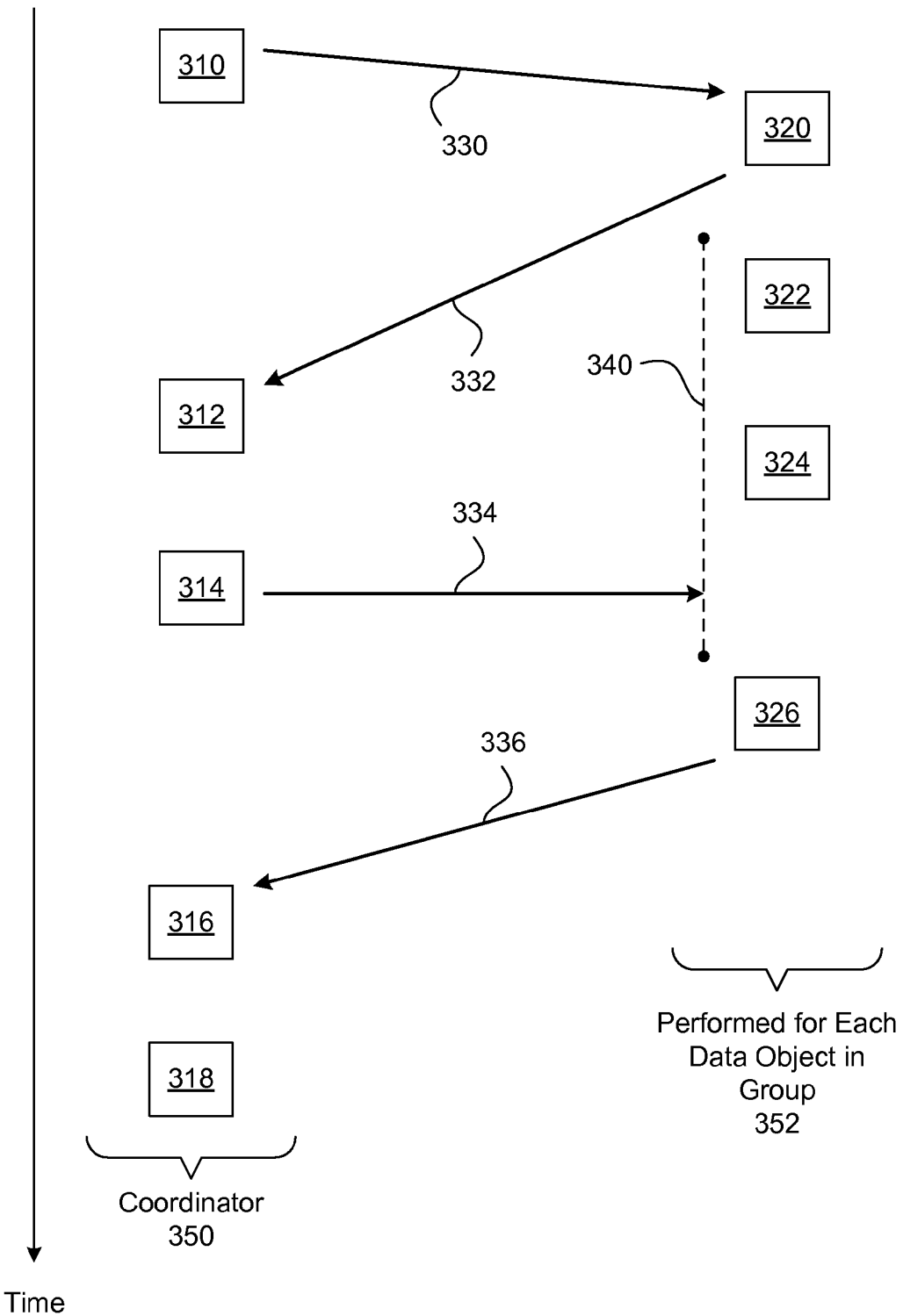
FIG. 3 illustrates a protocol for generating consistent snapshots for a group of data objects, according to a first embodiment of the invention.

FIG. 3 illustrates a protocol for generating consistent snapshots for a group of data objects, according to a first embodiment of the invention. The protocol is performed between a coordinator, such as coordinator 142 of FIG. 1, and at least one storage node with at least one data object, such as storage node 110 or 120. The storage node acts on behalf of a data object. The protocol includes coordinator actions 350 and storage node actions 352.

Each action 310 through 318, performed by the coordinator, is presented along a vertical time line, with increasing time indicated in a downward direction. Each action 310 through 318 is performed with respect to each data object in a respective group of data objects. For example, each command from the coordinator to a storage node is instantiated over the set of data objects within the group of data objects and sent to the appropriate storage node. Similarly, each acknowledgement associated with each data object within the group must be received for the coordinator to continue.

Each action 320 through 326 is presented along the same vertical time line and is performed with respect to a single data object by a storage node managing the data object. More specifically, if N data objects are in a group of participating data objects, then N instances of actions 320 through 326 are separately and asynchronously performed.

The protocol begins with the coordinator initiating a snapshot and designating a new snapshot identifier "Sx" for the group of data objects, "D." In action 310, the coordinator transmits a PREPARE command 330 for each data object "di" in the group "D" of data objects. In one embodiment, the PREPARE command 330 takes the form "PREPARE (di, Sx)." The coordinator transmits a PREPARE command 330 for each data object in group "D." The mapping of each data object to a storage node may be independent of this action, but a given PREPARE command 330 should be sent to the respective storage node for the given data object, "di."

When a storage node receives the PREPARE command 330, the storage node initiates action 320, which includes blocking new I/O operations issued to data object "di." Blocking I/O operations ensures that the result of the I/O operations will not be reflected in data object "di" and that the caller will not be informed of completion of the I/O. In this way, any causal chain of writes to data object "di" is blocked from proceeding at the issue stage of being stored. After blocking new I/O operations, the storage node transmits a PREPARE acknowledgement message 332 to the coordinator. In one embodiment, the PREPARE acknowledgement message 332 takes the form "PREPARE (di, Sx)=OK." After blocking new I/O operations, the storage node also takes action 322, whereby the storage node waits for all pending I/O operations (reads and writes) associated with the data object to complete, where pending I/O operations are I/O operations that were issued before the PREPARE command was received. After all pending I/O operations (reads and writes) associated with the data object have completed, the storage node performs action 324, whereby the storage node takes a snapshot of the data object "di" and associates the snapshot with identifier "Sx," indicated in the PREPARE command 330.

In action 312, the coordinator waits for a successful PREPARE acknowledgement message 332 for each data object "di" in group "D." After the coordinator receives a successful PREPARE acknowledgement message 332 for each data object "di," the coordinator performs action 314, in which the coordinator transmits a COMMIT command 334 for each data object in group "D." In one embodiment, the COMMIT command takes the form "COMMIT (di, Sx)."

After performing a snapshot of "di" in action 324, and after receiving a COMMIT command 334 from the coordinator anywhere in time line 340, the storage node performs action 326. In action 326, I/O operations are unblocked for storage object "di." After action 326, the storage node transmits a successful COMMIT acknowledgement message 336. In one embodiment the successful COMMIT acknowledgement message 336 takes the form "COMMIT (di, Sx)=OK."

After performing action 314, the storage node proceeds to action 316, where the storage node waits for a successful COMMIT acknowledgement message 336 for each data object "di." After the coordinator receives a successful COMMIT acknowledgement message 336 for each data object "di," the coordinator performs action 318, which includes any action related to successfully performing the coordinated snapshot of data objects in group "D." Persons skilled in the art will recognize that the specific actions taken in response to a successfully complete group snapshot will vary from application to application, without departing from the scope of this invention.

Figure 4:
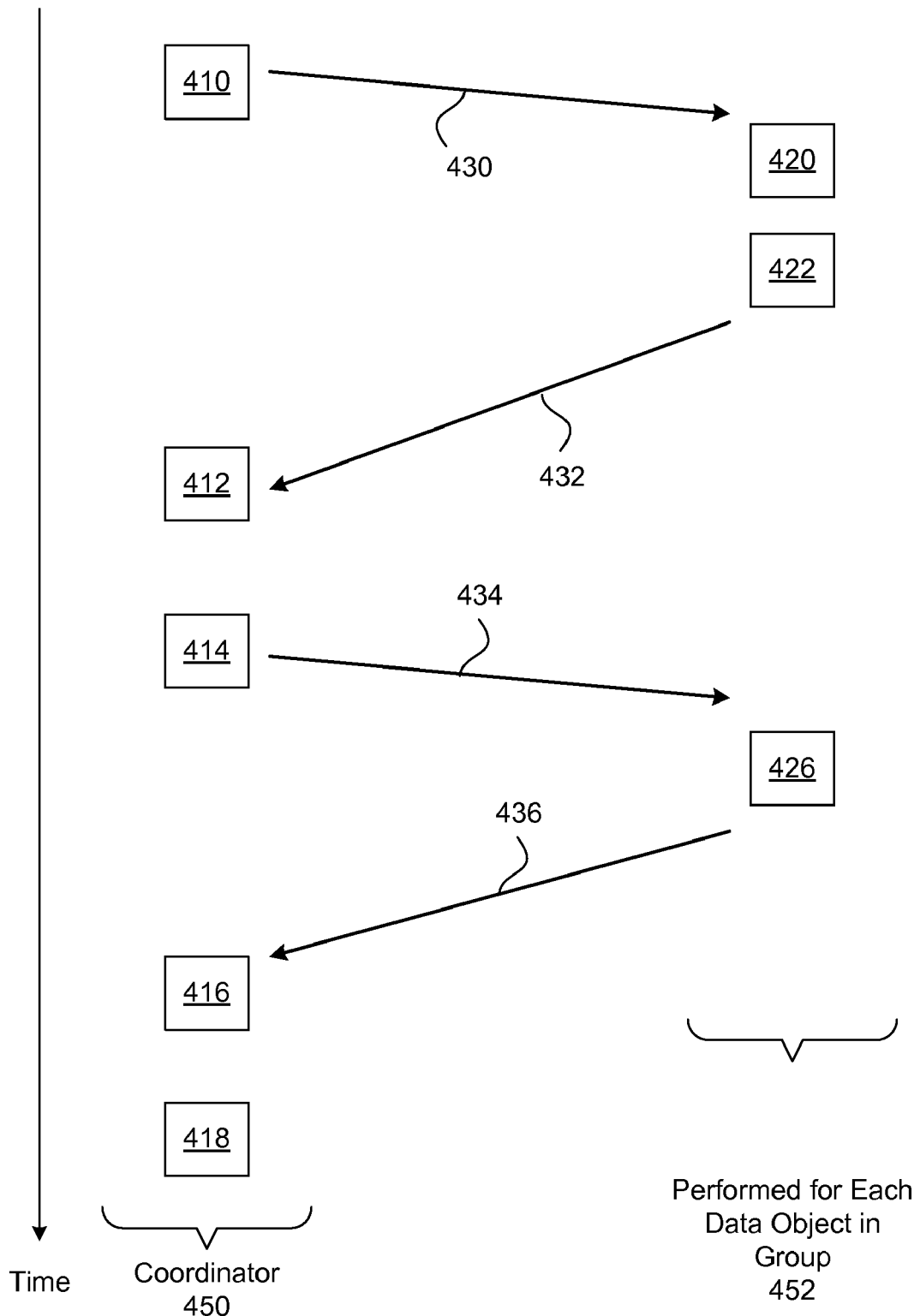
FIG. 4 illustrates a protocol for generating consistent snapshots for a group of data objects, according to a second embodiment of the invention.

FIG. 4 illustrates a protocol for generating consistent snapshots for a group of data objects, according to a second embodiment of the invention. The protocol is performed between a coordinator, such as coordinator 142, and at least one storage node with at least one data object, such as storage node 110 or 120. The storage node acts on behalf of a data object. The protocol includes coordinator actions 450 and storage node actions 452.

Each action 410 through 418, performed by the coordinator, is presented along a vertical time line, with increasing time indicated in a downward direction. Each action 410 through 418 is performed with respect to each data object in a respective group of data objects. For example, each command from the coordinator to a storage node is instantiated over the set of data objects within the group of data objects and sent to the appropriate storage node. Similarly, each acknowledgement associated with each data object within the group must be received for the coordinator to continue.

Each action 420 through 426 is presented along the same vertical time line and is performed with respect to a single data object by a storage node managing the data object. More specifically, if N data objects are in a group of participating data objects, then N instances of actions 420 through 426 are separately and asynchronously performed.

The protocol begins with the coordinator initiating a snapshot and designating a new snapshot identifier "Sx" for the group of data objects, "D." In action 410, the coordinator transmits a PREPARE command 430 for each data object "di" in the group "D" of data objects. In one embodiment, the PREPARE command 430 takes the form "PREPARE (di, Sx)." The coordinator transmits a PREPARE command 430 for each data object in group "D." The mapping of each data object to a storage node may be independent of this action, but a given PREPARE command 430 should be sent to the respective storage node for the given data object, "di."

When a storage node receives the PREPARE command 430, the storage node initiates action 420, which includes blocking the completion of I/O operations (both reads and writes) to data object "di." Subsequent I/O operations issued to data object "di" may be written to persistent storage, but their completion is blocked. Write operations included in such operations may or may not be reflected in the snapshot of data object "di." This method, by blocking I/O completions, prevents the storage client application from issuing any new I/O operations that could be causal dependents to write operations that have not been reflected in the snapshot. This ensures that any write operation reflected in a snapshot of the data object "di" has all of its causal predecessors reflected in some snapshot in the group, which ensures that the group is consistent.

After blocking I/O completion, the storage node also takes action 422, whereby the storage node takes a snapshot of the data object "di" and associates the snapshot with identifier "Sx," indicated in the PREPARE command 430. The precise state of the snapshot, whether some of the write operations issued concurrently to the snapshot protocol execution are reflected in the snapshot or not, is not relevant to the correctness of the method, because a write operation is only reflected in a snapshot if all write operations that are its potential causal predecessors are also reflected in some snapshot of the group. After performing snapshot "Sx" in action 422, the storage node transmits a PREPARE acknowledgement message 432 to the coordinator. In one embodiment, the PREPARE acknowledgement message 432 takes the form "PREPARE (di, Sx)=OK."

In action 412, the coordinator waits for a successful PREPARE acknowledgement message 432 for each data object "di." After the coordinator receives a successful PREPARE acknowledgement message 432 for each data object "di," the coordinator performs action 414, in which the coordinator transmits a COMMIT command 434 for each data object in group "D." In one embodiment, the COMMIT command takes the form "COMMIT (di, Sx)."

After receiving a COMMIT command 434 from the coordinator, the storage node performs action 426. In action 426, I/O completion is unblocked for storage object "di." After action 426, the storage node transmits a successful COMMIT acknowledgement message 436. In one embodiment the successful COMMIT acknowledgement message 436 takes the form "COMMIT (di, Sx)=OK."

After performing action 414, the storage node proceeds to action 416, where the storage node waits for a successful COMMIT acknowledgement message 436 for each data object "di." After the coordinator receives a successful COMMIT acknowledgement message 436 for each data object "di," the coordinator performs action 418, which includes any action related to successfully performing the coordinated snapshot of data objects in group "D." Persons skilled in the art will recognize that the specific actions taken in response to a successfully complete group snapshot will vary from application to application, without departing from the scope of this invention.

Figure 5A:
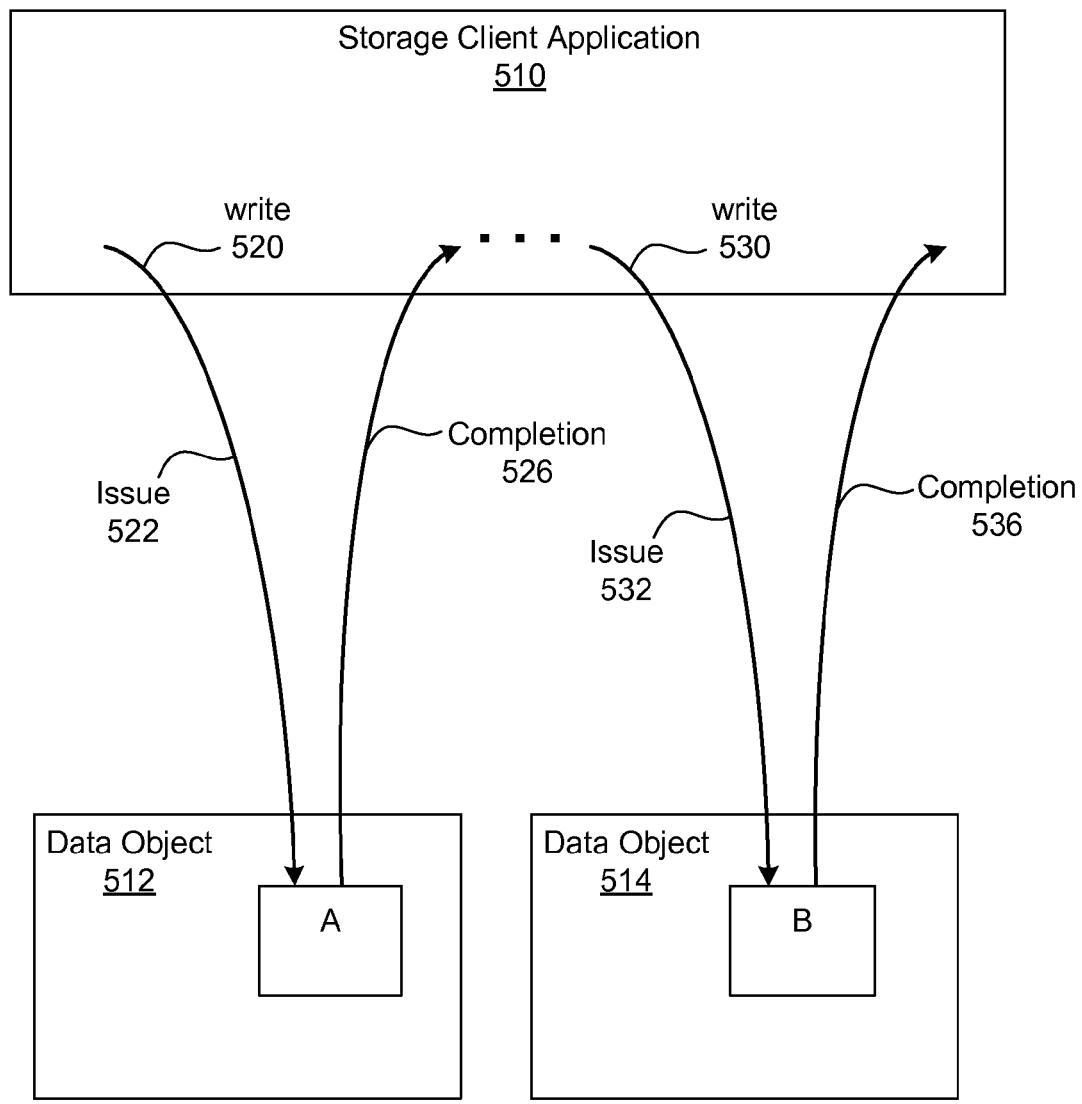
FIG. 5A illustrates the concept of causal dependency between two write operations.

FIG. 5A illustrates the concept of causal dependency between two write operations, write 520 and write 530. In this scenario, a storage client application 510 generates write operations to two different data objects 512 and 514. For application specific reasons, a causal chain is established between write operations, whereby a first write 520 to data object 512 completes before a second write 530 is initiated to data object 514. The first write 520 includes a write I/O operation 522 for data item A to data object 512, and I/O completion 526 is transmitted to storage client application 510. After transmission of the I/O completion 526, the storage client application 510 generates the second write 530. The second write 530 includes a write I/O operation 532 for data item B to data object 514, and I/O completion 536 is transmitted to storage client application 510.

After writes 520 and 530 are completed, data items A and B are presumed to be persistently stored in data object 512 and 514, respectively. The principles of consistency previously discussed in FIG. 2 apply in this scenario. More specifically, there are three states for data objects 512 and 514 that may be considered consistent. The first consistent state includes neither data item A nor B. The second consistent state includes only data item A. The third consistent state includes both data items A and B. Therefore, if data item B is present in data object 514, but data item A is not present, then the group of data objects 512, 514 is not consistent. Thus, any snapshot of the group of data objects 512 and 514 must conform to one of the three consistent states.

Figure 5B:
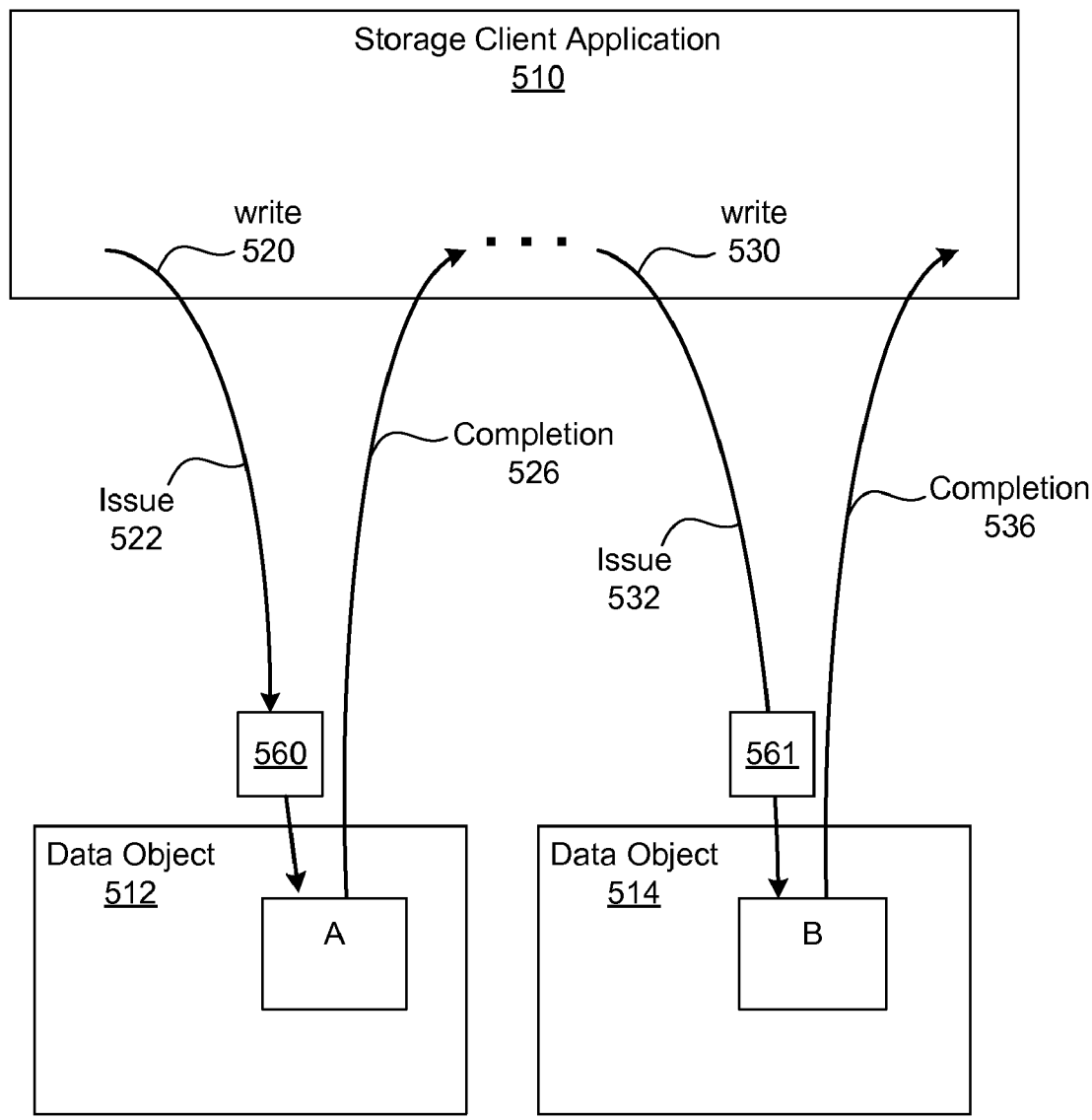
FIG. 5B illustrates issue blocking prior to taking a group-consistent snapshot, according to a first embodiment of the invention.
Figure 5C:
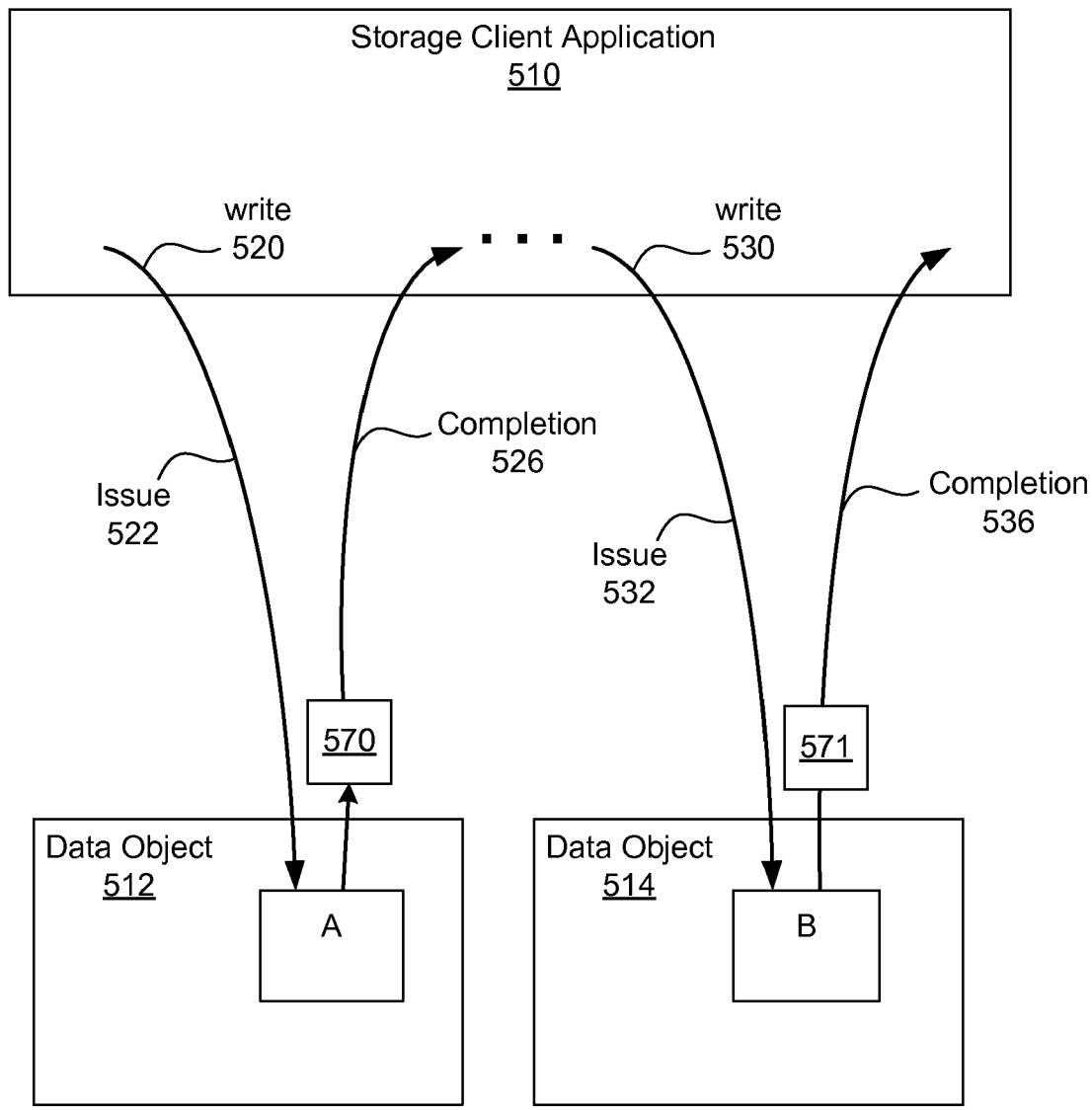
FIG. 5C illustrates completion blocking prior to taking a group-consistent snapshot, according to a second embodiment of the invention.

FIG. 5B illustrates issue blocking prior to taking a group-consistent snapshot, according to a first embodiment of the invention. Relative to FIG. 5A, the storage client application 510 interacts with data objects 512 and 514, executing writes 520, 530 via issuing of I/O operations 522, 532, and waiting for I/O completions 526, 536. However, I/O operations 522, 532 that are received after action 320 of FIG. 3 completes will be blocked from reaching data object 512, 514. For example, a command queue 560 may be configured to block I/O operation 522 and a command queue 561 may be configured to block I/O operation 532. With this arrangement, if I/O operation 522 is received after action 320 completes, neither write 520 nor write 530 will be carried out. If I/O operation 522 is pending but has not completed when action 320 completes, write 520 will be allowed to complete but write 530 will not be carried out because I/O operation 532 will be generated after action 320 completes. If write 520 has completed before action 320 completes, write 530 may or may not be carried out depending on when the I/O operation 532 is generated relative to action 320. In either case, however, crash consistency with respect to the potential causal dependency between write 520 and write 530 is preserved FIG. 5C illustrates completion blocking prior to taking a group-consistent snapshot, according to a second embodiment of the invention. Relative to FIG. 5A, the storage client application 510 interacts with data objects 512 and 514, executing writes 520, 530 via issuing of I/O operations 522, 532, and waiting for I/O completions 526, 536. However, I/O completion 526, generated after action 420 of FIG. 4 completes, will be blocked from being transmitted to storage client application 510. For example, a command queue 570 may be configured to block and queue I/O completion 526. With I/O completion 526 blocked, storage client application 510 does not generate write 530 until receiving I/O completion 526. In this fashion, crash consistency with respect to the potential causal dependency between write 520 and write 530 is preserved.

Figure 6A:
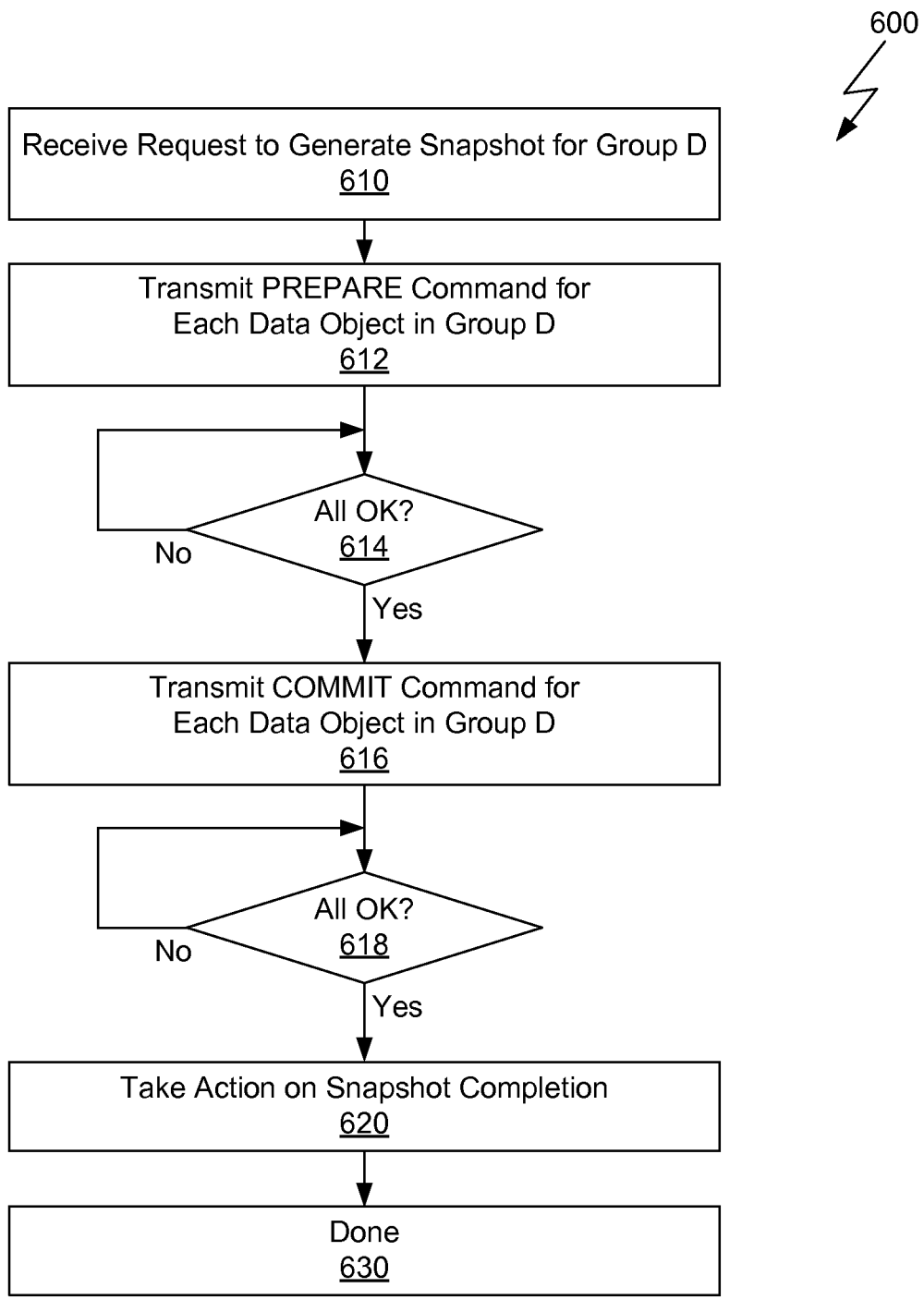
FIG. 6A is a flow diagram of method steps, performed by a coordinator, for generating consistent snapshots for a group of data objects, according to the first or second embodiment of the invention.

FIG. 6A is a flow diagram of method steps 600, performed by a coordinator, for generating consistent snapshots for a group of data objects, according to the first or second embodiment of the invention. Although the method steps are described in conjunction with the system of FIG. 1, persons skilled in the art will understand that any system configured to perform the method steps is within the scope of the invention.

The method begins in step 610, where a coordinator receives a request to generate a snapshot for a group, "D," of data objects. In step 612, the coordinator transmits a PREPARE command for each data object within group "D." Each PREPARE command is routed to the storage node hosting the specified data object. If, in step 614, all PREPARE commands are acknowledged with an "OK" status, then the method proceeds to step 616, where the coordinator transmits a COMMIT command for each data object within group "D." If, in step 618, all COMMIT commands are acknowledged with an "OK" status, then the method proceeds to step 620, where the coordinator takes action related to the successful completion of the snapshot for group "D." The method terminates in step 630.

Returning to step 614, if all PREPARE commands are not acknowledged with an "OK" status, then the method proceeds back to step 614, effectively executing a wait loop. Persons skilled in the art will recognize that certain timeout conditions may be incorporated into wait loops of this nature. Error handling may be incorporated into this method, as appropriate, to respond to scenarios such as wait loop time-outs and explicit error messages encountered at this step, without departing from the scope of this invention.

Returning to step 618, if all COMMIT commands are not acknowledged with an "OK" status, then the method proceeds back to step 618, effectively executing a wait loop. Persons skilled in the art will recognize that certain timeout conditions may be incorporated into wait loops of this nature. Error handling may be incorporated into this method, as appropriate, to respond to scenarios such as wait loop time-outs and explicit error messages encountered at this step, without departing from the scope of this invention.

Figure 6B:
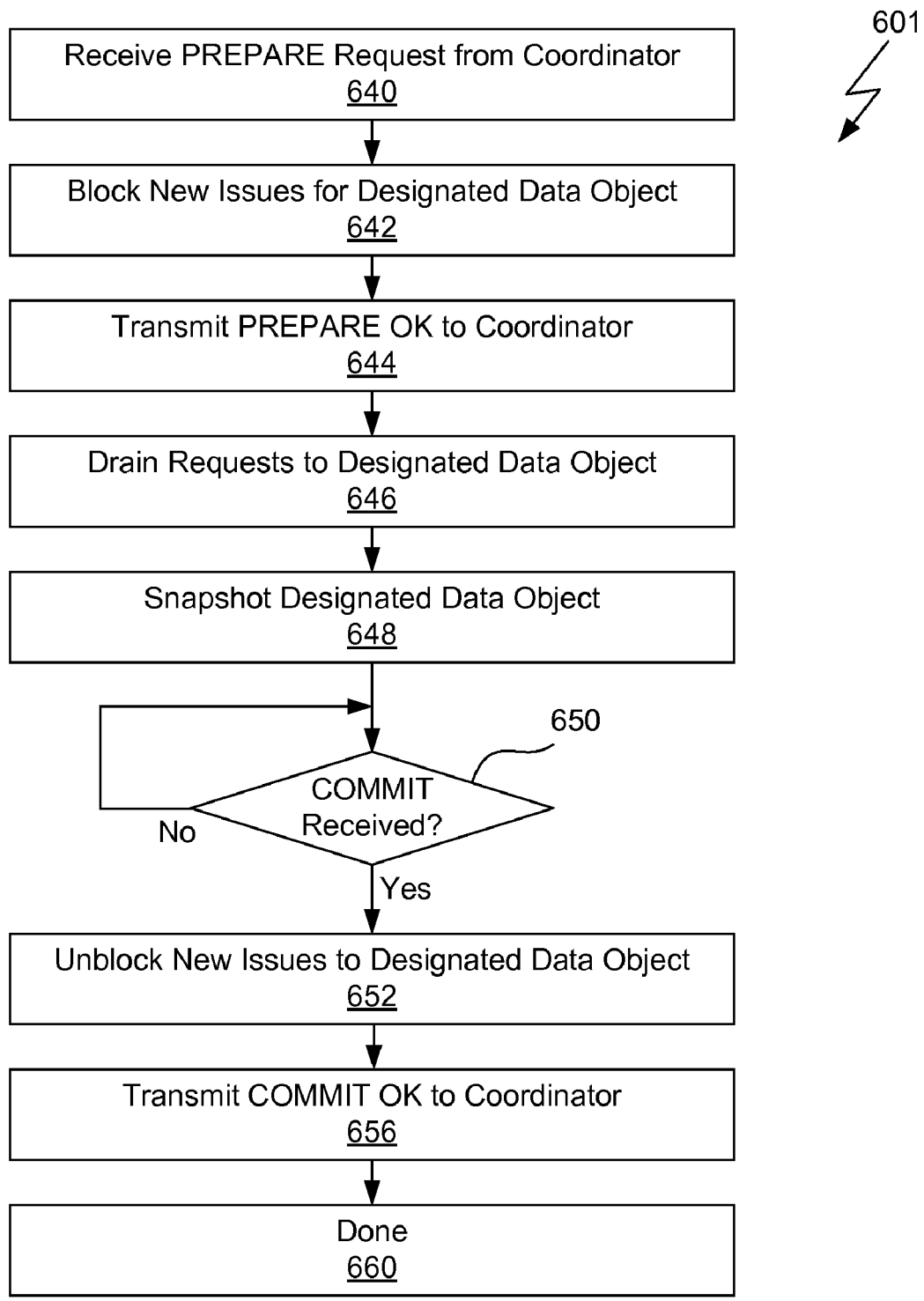
FIG. 6B is a flow diagram of method steps, performed by a storage node, for generating consistent snapshots for a group of data objects, according to a first embodiment of the invention.

FIG. 6B is a flow diagram of method steps 601, performed by a storage node, for generating consistent snapshots for a group of data objects, according to a first embodiment of the invention. Although the method steps are described in conjunction with the system of FIG. 1, persons skilled in the art will understand that any system configured to perform the method steps is within the scope of the invention.

The method begins in step 640, where a storage node receives a PREPARE request from the coordinator. The PREPARE request indicates which data object is designated ("di") and specifies an associated snapshot identifier ("Sx"). In step 642, the storage node blocks new I/O operations issued to the designated data object ("di"). In step 644, the storage node transmits a PREPARE OK message to the coordinator, with an embedded indication of which designated data object and identifier combination is reporting this status. In step 646, the storage node waits for all pending I/O operations associated with the designated data object to complete. In step 648, the storage node takes a snapshot of the designated data object and associates the identifier with the snapshot.

If, in step 650 a COMMIT command is received, then the method proceeds to step 652, where the storage node unblocks new I/O operations issued to the designated data object. In step 656, the storage nodes transmits a message to acknowledge the COMMIT message of the coordinator, with an embedded indication of which designated data object and identifier combination is reporting this status. The method terminates in step 660.

Returning to step 650, if a COMMIT command is not received, then the method proceeds back to step 650, essentially forming a wait loop. Persons skilled in the art will recognize that certain timeout conditions may be incorporated into wait loops of this nature. Error handling may be incorporated into this method, as appropriate, to respond to scenarios such as wait loop time-outs and explicit error messages encountered at this step, without departing from the scope of this invention. For example, after a time-out period has lapsed, the storage node may abort and return to step 640. Also, if group-consistent snapshot creation needs to be aborted, then as a result of an abort message, a data object snapshot is removed, if it was created.

Figure 6C:
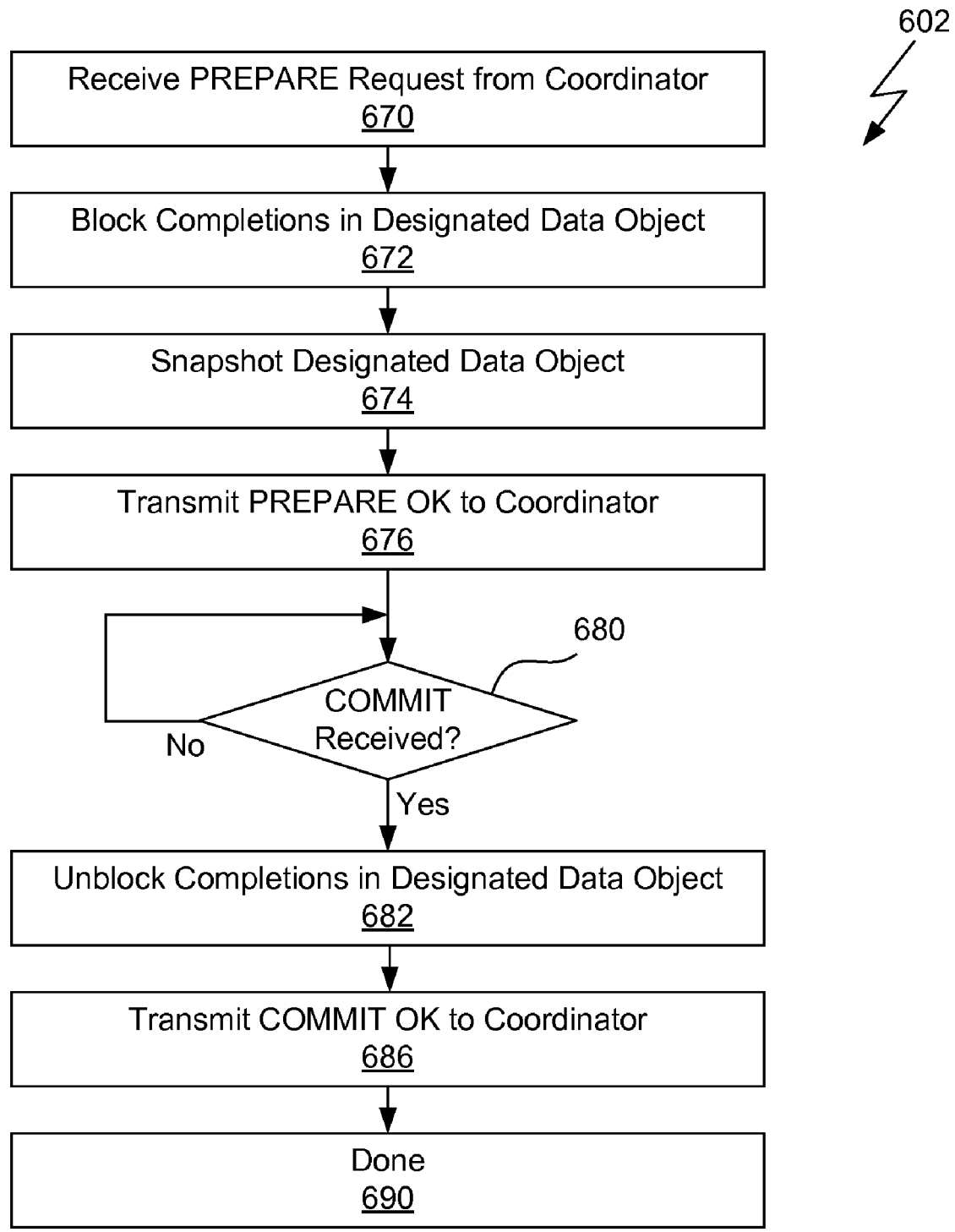
FIG. 6C is a flow diagram of method steps, performed by a storage node, for generating consistent snapshots for a group of data objects, according to a second embodiment of the invention.

FIG. 6C is a flow diagram of method steps 602, performed by a storage node, for generating consistent snapshots for a group of data objects, according to a second embodiment of the invention. Although the method steps are described in conjunction with the system of FIG. 1, persons skilled in the art will understand that any system configured to perform the method steps is within the scope of the invention.

The method begins in step 670, where a storage node receives a PREPARE request from the coordinator. The PREPARE request indicates which data object is designated ("di") and specifies an associated snapshot identifier ("Sx"). In step 672, the storage node blocks completion of any I/O operations issued to the designated data object ("di"). In step 674, the storage node takes a snapshot of the designated data object and associates the identifier with the snapshot. In step 676, the storage node transmits a PREPARE OK message to the coordinator, with an embedded indication of which designated data object and identifier combination is reporting this status.

If, in step 680 a COMMIT command is received, then the method proceeds to step 682, where the storage node unblocks completion of any I/O operations issued to the designated data object. In step 686, the storage nodes transmits a message to acknowledge the COMMIT message of the coordinator, with an embedded indication of which designated data object and identifier combination is reporting this status. The method terminates in step 690.

Returning to step 680, if a COMMIT command is not received, then the method proceeds back to step 680, essentially forming a wait loop. Persons skilled in the art will recognize that certain timeout conditions may be incorporated into wait loops of this nature. Error handling may be incorporated into this method, as appropriate, to respond to scenarios such as wait loop time-outs and explicit error messages encountered at this step, without departing from the scope of this invention. For example, after a time-out period has lapsed, the storage node may abort and return to step 670. Also, if group-consistent snapshot creation needs to be aborted, then as a result of an abort message, a data object snapshot is removed, if it was created.

While the forgoing is directed to various embodiments of the invention, other and further embodiments of the invention may be devised without departing from the basic scope thereof. Also, embodiments of the invention may be implemented in hardware or software or in a combination of hardware and software. One embodiment of the invention may be implemented as a program product for use with a computer system. The program(s) included in the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

We claim:

1. A method for coordinating snapshots for multiple data objects included on at least one storage node in order to achieve group-consistency among the snapshots, comprising:
   issuing a first command for each of the data objects to block completion of I/O operations issued to the said data object and then create a snapshot of said data object wherein the first command calls an action that blocks any I/O completions for each of the data objects generated after the action from being transmitted from the at least one storage node to an originator of the I/O operations;
   receiving a response to the first command for each of the data objects, each response to the first command being indicative that creation of a snapshot has been completed;
   issuing a second command for each of the data objects to unblock completion of I/O operations; and
   receiving a response to the second command.

2. The method according to claim 1, wherein for each of the data objects, after the second command is issued, I/O completion is unblocked for the said data object.

3. The method according to claim 1, wherein the multiple data objects are managed by a single storage node, and the first command is received by said storage node, in response to which said storage node blocks completion of I/O operations issued to the said data objects and then creates a snapshot of the data objects.

4. The method according to claim 1, wherein the multiple data objects are managed by a single storage node, and the second command is received by said storage node, and wherein said storage node issues said response to the second command when it has confirmed that a snapshot has been created for each of said data objects.

5. The method according to claim 1, wherein the multiple data objects are managed by at least one storage node, and the second command is not issued until the response to the first command is received from each of said at least one storage node.

6. The method according to claim 5, wherein said receiving a response to the second command includes receiving a response to the second command from each of said at least one storage node.

* * * * *